Figure 1:
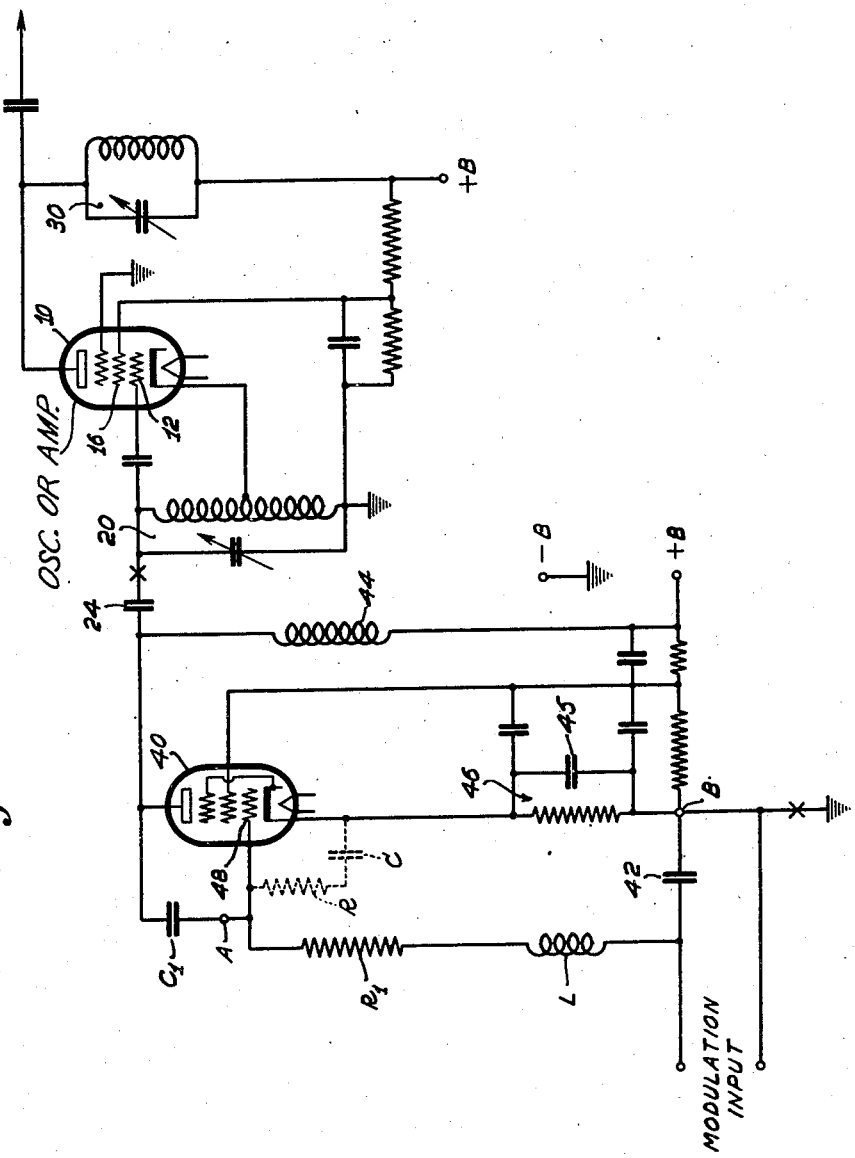

June 22, 1948.    H. O. PETERSON    2,443,746
TUBE REACTANCE AND MODULATOR
Filed Dec. 1, 1943    3 Sheets-Sheet 3

INVENTOR.
Harold O. Peterson
BY
H. G. Grover
ATTORNEY.

Patented June 22, 1948

2,443,746

UNITED STATES PATENT OFFICE 2,443,746

TUBE REACTANCE AND MODULATOR

Harold O. Peterson, Riverhead, N. Y., assignor to Radio Corporation of America, a corporation of Delaware Application December 1, 1943, Serial No. 512,472

10 Claims. (Cl. 179—171.5)

This application concerns variable tube reactances used in electrical circuits such as automatic frequency control circuits, angular velocity modulation circuits and other applications of this nature, wherein there is a need of a pure reactance which is variable.

The general object of my invention is to improve tube reactances of the nature described above and in Crosby United States Patent #2,278,429, dated April 7, 1942.

In the tube reactance involved here, the tube anode and cathode are connected to an alternating current source, for example, a tank circuit wherein an alternating current flows and the anode is coupled to the cathode by a condenser and impedance in series in the order given, with the tube grid tapped to the junction point of the condenser and impedance. The impedance is made small as compared to the reactance of the capacity so that the phase of the alternating current flowing in the connection is determined by the capacitive reactance and the potential drop across the impedance takes the phase of the current and leads the plate voltage by about 90°. Thus the amplified current in the tube to the anode leads the anode voltage about 90° and a reactive effect is produced in the tube. The tube simulates a capacity since the amplified current to the anode leads the anode voltage.

It can be seen that it is of importance that the impedance in the phase shifting circuit be a resistance (with little or no reactance) or the phase quadrature relation between the grid voltage and anode voltage desired for reasons described above will not be obtained.

A more detailed object of this invention is to improve reactance tubes of this type by providing in an arrangement of the nature described, an impedance in the said series circuits between the control grid and cathode that is substantially purely resistive.

In some cases, say in telephony and television systems, such tube reactances are used for angular modulation of wave energy through a considerable frequency range. In these cases the voltage fed back from the anode to the series circuit between the anode and cathode changes in frequency over a considerable range, and it is of importance that the said resistance between the control grid and cathode be substantially resistance only throughout the range of operation so that the said phase quadrature relation between the voltage on the grid and anode will be maintained.

An additional object of my invention is to provide in reactance tube connections of this type a grid to cathode network which is substantially only resistive for a wide band of operating frequencies.

Other objects and the manner in which the same are attained and the benefits derived from attainment thereof will appear from the following detailed description of my invention. In this description reference will be made to the attached drawings wherein Fig. 1 illustrates a reactance tube and phase shifting network of the type involved herein a tuned circuit of an oscillator for the production of angular velocity modulated oscillations, while Figs. 2 and 3 each illustrate an embodiment of a tube reactance arranged in accordance with my invention, and Figs. 2a and 3a are modifications of Figs. 2 and 3 respectively. In these embodiments the grid to cathode impedance is substantially pure resistance which is constant over a wide band of frequencies.

For purposes of illustration I have shown my tube reactance as being associated with an oscillation generator in such a manner that the generated oscillations are angular velocity modulated. The oscillator comprises a tube 10 having a control grid 12 and a second grid 16 serving as an anode coupled in a grounded anode regenerative circuit of the Hartley type, including tank circuit 20. The output circuit 30 is coupled by the electron stream in the tube to the generator electrodes and circuit.

It will be understood that the circuit 20 may represent any tuned circuit such as, for example, the input or output circuit of an amplifier stage.

One end of the tuned circuit 20 is coupled by coupling and blocking condenser 24 to the anode of the reactance tube 40, while the other end thereof is grounded, being thereby coupled to the cathode of the reactance tube 40 which is grounded for radio frequency by the bypass condenser 45 of the cathode bias circuit 46 for tube 40. The anode of the tube 40 is coupled by a phase shifting network including capacity C1, resistance R1 and coupling condenser 42 to the cathode. The capacity and resistance between the grid and cathode within the tube is of this phase shifting circuit, but is for the time being disregarded. The connections of the electrodes of tubes 10 and 40 including the choking inductance 44 to the power supply are usual and need not be described.

The alternating voltage from the high radio frequency potential end of tank circuit 20 appears on the anode of tube 40 and across circuit C1, R1. The resistance R1 is made small as compared to C1, so that the current through this network across the tank 20 is of a phase determined by the reactance of C1 and leads the applied voltage. (The condensers 42 and 45 are large and may be disregarded in this consideration of the network.) Thus the potential drop in R1 leads the potential at the anode of tube 40, and this voltage is applied to the grid 48 so that the radio frequency current in the tube 40 (which is in phase with the grid voltage) leads the anode voltage by about 90°. Thus the current in the tube supplied to the tank circuit 20 over choking inductance 44 leads the generated current in tank circuit 20 about 90° and the tube 40 simulates a capacitive reactance in parallel with the tank circuit 20.

The value of the simulated reactance of tube 40 depends on the tube's conductance and this may be controlled by control potentials or modulation potentials supplied between the grid 48 and the cathode by the leads labeled modulated input. In the embodiment illustrated, the oscillations developed by 10 in circuit 20 will be modulated as to timing in accordance with the control or modulating potentials applied to the grid of tube 40.

Since, as stated above, that portion of the network between the grid and cathode includes the capacity C and resistance R within the tube represented by dotted lines, and also the inductance of the leads, the network between the grid and cathode in practice is not purely resistive. Even if this impedance could be made substantially resistive at a selected frequency, it would not be constant and resistive for a wide band of frequencies such as used in an angular velocity modulation system. Thus there is present a reactive effect which shifts the phase of the current in the network and the grid voltage may not take up the substantially exact phase quadrature relation to cause the tube to simulate a pure reactance. In my improved arrangement, means is provided to insure a pure resistance in the phase shifting network between the grid and cathode of the reactance tube, which resistance is constant over the band of frequencies wherein operation is carried out.

Figure 2:
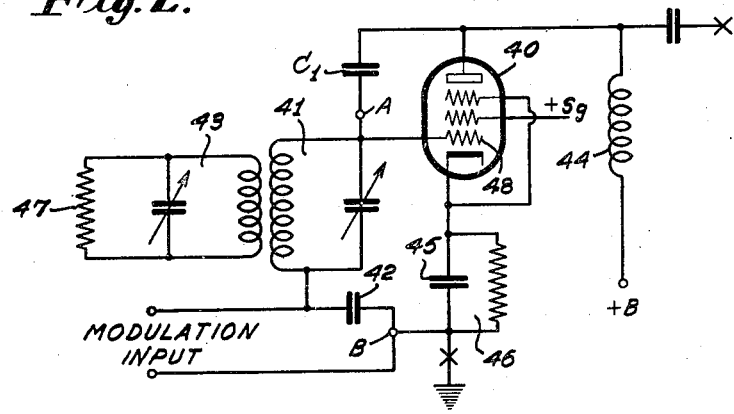
Figure 2A:
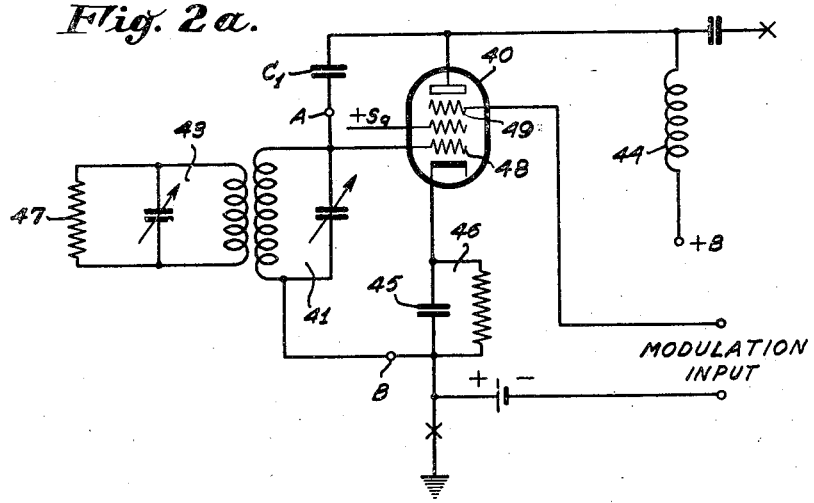
Figure 3:
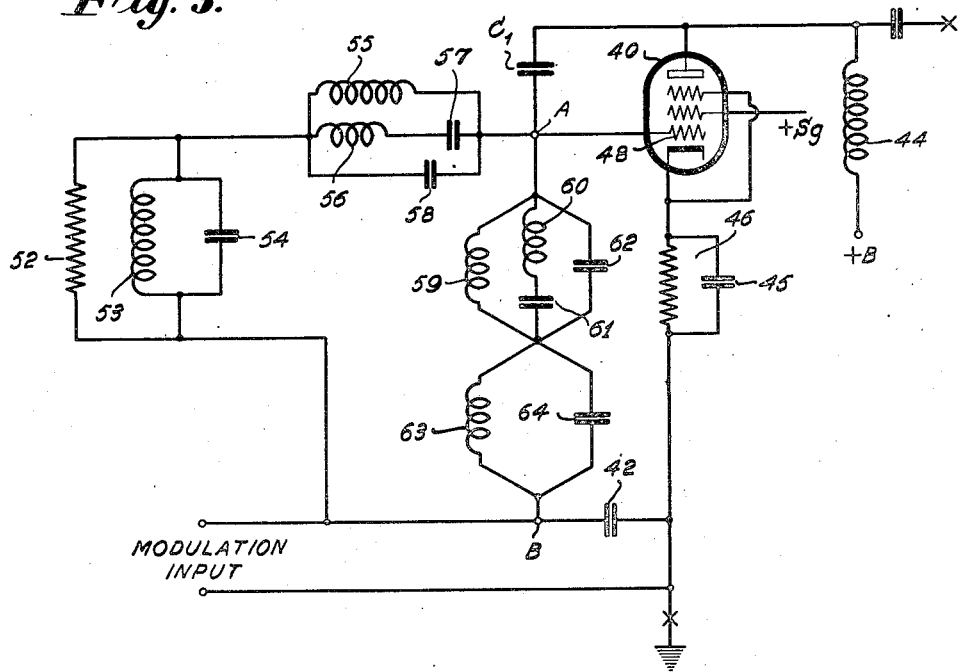
Figure 3A:
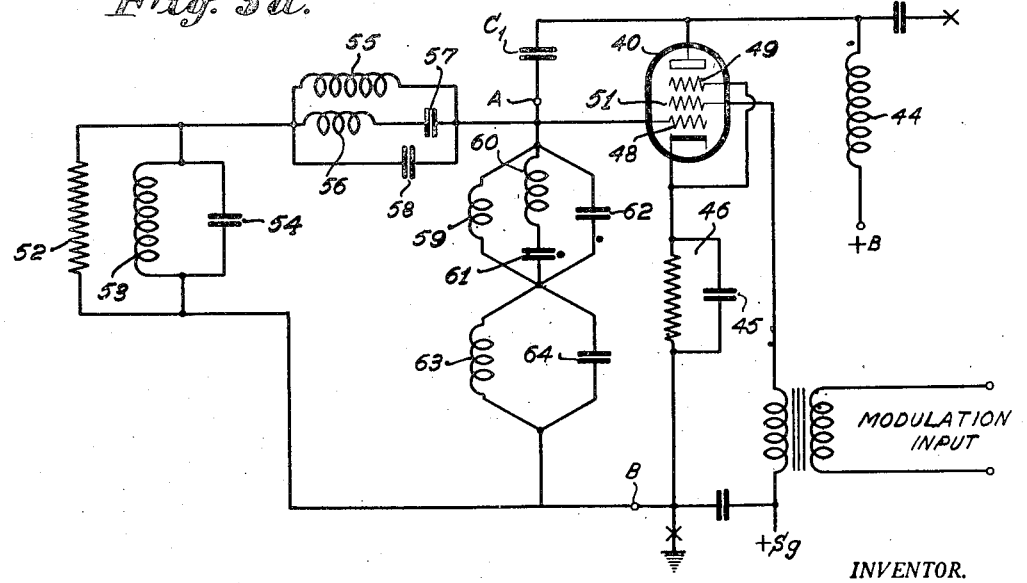

In the modification illustrated in Fig. 2 the phase shifting network comprises between the points A and B in place of R1 of Fig. 1, a circuit 41 tuned to the carrier frequency and a circuit 43 tuned also to the carrier frequency and coupled to circuit 41, with a resistance 47 in shunt to tuned circuit 43. Since the circuits are resonant at the frequency of operation the impedance between A and B is nearly purely resistance and since the characteristic of the tuned circuit is broadened by 43 and 47 coupled thereto the resistance is constant over a wide range of frequencies.

Where a wider modulation range is involved it may be desirable to use the arrangement of Fig. 3. In this arrangement a type MM network the resistance of which is substantially constant over the entire frequency band is used between the points A and B in place of the resistance R1 of Fig. 1.

As stated above in Fig. 3, the resistance R1 of Fig. 1 is replaced by a network of constant impedance over a wide band of frequencies. This network per se, is known in the art, as is the manner in which the circuit element values are derived. The network is a shunt terminal transducer of the MM type formed by merging a midhalf series MM transducer with a shunt terminal transducer of the MM type to provide the network illustrated.

This network has at one end a shunt branch comprising inductance 53 and condenser 54 closed by a resistance 52, a mid-half series MM comprising inductances 55 and 56 and condensers 57 and 58, and at the other end an MM shunt branch comprising inductances 59 and 60, condensers 61 and 62 and inductance 63 and condenser 64.

Condenser C1 is as in Fig. 1, and condenser 42 is large as is condenser 45, so that they may be disregarded in arriving at the network constants. The reactance and resistance between the control grid 48 and cathode is considered in determining the network constants. The network shown is a wave filter having a network terminating impedance 52 and having at this end (52, 53 and 54) an image impedance equal at all frequencies to the mid-series impedance provided by inductances 55, 56 and condensers 57 and 58, and at the other end (the shunt impedance provided by inductances 59, 60 and 63 and condensers 61, 62 and 64) an image impedance which is of approximately the same value as the aforesaid impedance and of a constant resistance value at all frequencies in the transmitted band.

The network per se, is not claimed as novel herein. The network used here has been shown generally in Fig. 10, page 311, and more specifically in the lower figure of page 338 of the Bell System Technical Journal for April, 1931. The network has characteristics as illustrated in Fig. 9 of page 308 of this publication, and has been described in detail therein.

In some cases it may be desirable to apply the modulating potentials to a tube electrode other than the control grid to thereby moulate the tube transconductance. In the modification of Fig. 2a the modulation is applied to the suppressor grid 49. This modification is otherwise substantially the same as the modification in Fig. 2. In the modification of Fig. 3a the modulation is applied to the screen grid 51. This modification is otherwise substantially the same as the modification in Fig. 3.

The modifications of Figs. 2a and 3a may in some instances be desirable in order to make it easier to get a wide band of modulation frequencies, as for example, when television signals are used. When the modulation is applied to the suppressor grid as in Fig. 2a or to the screen grid as in Fig. 3a the phase shifting network in the control grid (No. 1 grid) to cathode circuit may be directly grounded as shown in Figs. 2a and 3a.

I claim:

1. A simulated reactance comprising an electron discharge device having an electron flow control electrode, an electron receiving electrode and a cathode, connections for applying alternating current the frequency of which may vary over a wide range across said electron receiving electrode and cathode, a phase shifting circuit comprising a condenser and an impedance in series in the order given, coupling said electron receiving electrode to said cathode with the junction point between the condenser and impedance coupled to the electron flow control electrode, the impedance providing a resistance which is substantially constant over a wide range of applied frequencies and which is small as compared to the reactance of the condenser whereby the alternating potential developed across the impedance is substantially in quadrature with the electron receiving electrode voltage throughout said range and the device simulates a reactance, said substantially constant impedance comprising a circuit tuned to the frequency of the alternating current coupled between the electron flow control electrode and cathode, and a second circuit tuned to the same frequency and shunted by resistance and coupled to said first circuit.

2. A simulated reactance comprising an electron discharge device having an electron flow control electrode, an electron receiving electrode and a cathode, connections for applying alternating current the frequency of which may vary over a wide range across said electron receiving electrode and cathode, a phase shifting circuit comprising a condenser and an impedance in series in the order given coupling the electron receiving electrode to said cathode with the junction point between the condenser and impedance coupled to the electron flow control electrode, the impedance providing a resistance which is substantially constant over a wide range of applied frequencies and which is small as compared to the reactance of the condenser whereby the alternating potential developed across the impedance is about in quadrature with the voltage on the electron receiving electrode and the device simulates a reactance, said constant impedance comprising a network of the MM type having a first branch connected between the electron flow control electrode and cathode, a second branch coupled at one end to the cathode and a third branch coupled between the electron flow control electrode and the other end of said second branch.

3. In a signalling system, a tuned circuit wherein oscillatory energy covering a wide range of frequencies is developed, an electron discharge device having an anode-like electrode and a cathode in shunt to said circuit, said device having a control electrode, a phase shifting circuit comprising a condenser and a resistance in series between the anode-like electrode and cathode of said device, the reactance of said condenser being large as compared to the impedance of said resistance whereby the current therethrough is determined by the capacitive reactance of said condenser and leads the applied voltage, and connections for applying the potential drop across said resistance to the control electrode of said device whereby the alternating current in the device is substantially in phase quadrature with the voltage on the anode thereof and said device simulates a reactance, said resistance comprising a constant impedance network including a first circuit tuned to the mean of said frequency range and coupled between the control electrode and cathode, a second circuit coupled to the last mentioned circuit and tuned to the same frequency and a resistance in shunt to said last circuit.

4. In a signalling system, a circuit wherein oscillatory energy covering a wide band of frequencies is to be developed, an electron discharge device having an anode and a cathode in shunt to said circuit, said device having a control electrode, a phase shifting circuit comprising a condenser and a resistance in series between the anode and cathode of said device, the reactance of said condenser being large as compared to the impedance of said resistance whereby the current therethrough is determined by the capacitive reactance of the condenser and leads the applied voltage, and connections for applying the potential drop across said resistance to the control grid of said device whereby the alternating current in the device is substantially in phase quadrature with the voltage on the anode thereof and said device simulates a reactance, said resistance comprising a constant impedance network of the MM type having two shunt branches separated by a series branch with a shunt branch between said control electrode and cathode so that said phase quadrature relation is maintained over a wide range of frequencies and said device simulates a substantially pure capacity over said wide range of frequencies.

5. In a signalling system, a tuned circuit wherein oscillatory energy covering a wide range of frequencies is developed, an electron discharge device having an anode-like electrode and a cathode in shunt to said circuit, said device having a control electrode, a phase shifting circuit comprising a condenser and a resistance in series between the anode-like electrode and cathode of said device, the reactance of said condenser being large as compared to the impedance of said resistance whereby the current therethrough is determined by the capacitive reactance of said condenser and leads the applied voltage, connections for applying the potential drop across said resistance to the control electrode of said device whereby the alternating current in the device is substantially in phase quadrature with the voltage on the anode thereof and said device simulates a reactance, said resistance comprising a constant impedance network including a first circuit tuned to the mean of said frequency range and coupled between the control grid and cathode, a second circuit coupled to the last mentioned circuit and tuned to the same frequency and a resistance in shunt to said last circuit, a source of modulating potentials and a coupling between said source of modulating potentials and electrodes of said device to modulate its transconductance to thereby correspondingly modulate the timing of the oscillatory energy.

6. In a signalling system, a circuit wherein oscillatory energy covering a wide band of frequencies is developed, an electron discharge device having an anode and a cathode in shunt to said circuit, said device having a control electrode, a phase shifting circuit comprising a condenser and a resistance in series between the anode and cathode of said device, the reactance of said condenser being large as compared to the impedance of said resistance whereby the current therethrough is determined by the capacitive reactance of the condenser and leads the applied voltage, connections for applying the potential drop across said resistance to the control electrode of said device whereby the alternating current in the device is substantially in phase quadrature with the voltage on the anode thereof and said device simulates a reactance, said resistance comprising a constant impedance network of the MM type having two shunt branches separated by a series branch with a shunt branch between said control electrode and cathode so that said phase quadrature relation is maintained over a wide range of frequencies and said device simulates a substantially pure capacity over said wide range of frequencies, a source of modulating potentials and a coupling between said source of modulating potentials and electrodes of said tube to modulate its transconductance to thereby correspondingly modulate the timing of the oscillatory energy.

7. In a frequency modulation system, a tuned circuit wherein oscillatory energy the frequency of which is to be modulated through a wide range flows, an electron discharge device having an anode, a cathode and a control grid, leads connecting said tuned circuit in shunt to the impedance within the device between said anode and cathode electrodes, a phase shifting circuit comprising a condenser and an impedance in series in the order given coupling the anode electrode to the cathode electrode, a connection between the junction point between the condenser and impedance and the control grid of the device, said impedance providing a resistance which is substantially constant over a wide range of applied frequencies and which is small as compared to the reactance of the condenser whereby the alternating potential developed across the impedance is about in quadrature with the voltage on the anode electrode of the device and the said device simulates a reactance, said constant impedance comprising a network of the MM type having a first branch connected between the control grid and cathode, a second branch coupled at one end to the cathode and a third branch coupled between the control grid electrode and the other end of said second branch, and a source of modulating potentials coupled with electrodes of said device.

8. In a frequency modulation system, a tuned circuit wherein oscillatory energy to be modulated through a wide range flows, an electron discharge device having an anode, a cathode and two control electrodes, means coupling the impedance between the anode and cathode of said device in shunt to a part at least of said tuned circuit, a phase shifting circuit comprising a condenser and an impedance in series between the anode and cathode of said device, the reactance of said condenser being large as compared to the impedance of said impedance whereby the current through the connection is determined primarily by the capacitive reactance of said condenser and leads the applied voltage, connections for applying the potential drop across said impedance to a control electrode of said device whereby the oscillatory current in the device is substantially in phase quadrature with the voltage on the anode thereof and said device simulates a reactance, said impedance comprising a constant impedance network including a first circuit tuned to the mean frequency of said wide range of frequencies and coupled between the control electrode and ground, a biasing resistance coupling the cathode of said tube to ground, a capacity of low impedance to potentials of the frequency of said oscillatory energy in shunt to said biasing resistance, a second tuned circuit coupled to the last mentioned tuned circuit and tuned to the same frequency, a resistance in shunt to said last named tuned circuit, and a source of modulating potentials connected between a second control electrode of said device and ground.

9. In a frequency modulation system, a tuned circuit wherein oscillatory energy the frequency of which is to be modulated through a wide range is developed, an electron discharge device having an anode, a cathode and a control grid, leads connecting the impedance between the anode and cathode of said device in shunt to a portion at least of said tuned circuit, a phase shifting circuit comprising a condenser and an impedance in series in the order given between the anode and cathode of said device, the reactance of said condenser being large as compared to the impedance of said impedance whereby the current through the connection is determined primarily by the capacitive reactance of said condenser and leads the applied voltage, connections for applying the potential drop across said impedance to the control electrode of said device whereby the alternating current in the device is substantially in phase quadrature with the voltage on the anode thereof and said device simulates a reactance, said impedance comprising a constant impedance network including a first circuit tuned to the mean frequency of said frequency range and coupled between the control electrode and cathode, a second circuit coupled to the last mentioned circuit and tuned to the same frequency, a resistance in shunt to said second circuit, and means for applying modulating potentials to electrodes in said device.

10. In a frequency modulation system, a tuned circuit wherein oscillatory energy to be modulated through a wide range of frequencies is developed, an electron discharge device having an anode, a cathode and two control grid electrodes, leads connecting the impedance between the anode and cathode of said device in shunt to a portion at least of said tuned circuit, a phase shifting circuit comprising a condenser and a resistance in series in the order given coupling the anode to the cathode with the junction point between the condenser and resistance coupled to a control electrode, the resistance being substantially constant over a wide range of frequencies and being small as being compared to the reactance of the condenser whereby the oscillatory potential developed across the resistance is about in quadrature with the voltage on the anode electrode and the device simulates a reactance, said constant impedance comprising a network of the MM type having a first branch connected between the said control electrode and ground, a second branch coupled at one end to ground, and a third branch coupled between the control electrode and the other end of said second branch, a grid leak resistance and bypass condenser in series coupling the cathode of said device to ground, and a source of modulating potentials coupled between the other of said control electrodes and ground.

HAROLD O. PETERSON.

REFERENCES CITED

The following references are of record in the file of this patent:

UNITED STATES PATENTS

| Number | Name | Date |
|---|---|---|
| 1,950,541 | Carpe | Mar. 13, 1934 |
| 2,206,041 | Moore | July 2, 1940 |
| 2,278,429 | Crosby | Apr. 7, 1942 |